(12) United States Patent
Aziz et al.

(10) Patent No.: US 12,319,178 B2
(45) Date of Patent: Jun. 3, 2025

(54) ELEVATED VEHICLE SYSTEM

(71) Applicants: Mubeen Aziz, Durham, NC (US); Razia Aziz, Durham, NC (US); Hamid Aziz, Durham, NC (US); Mateen Aziz, Durham, NC (US)

(72) Inventors: Mubeen Aziz, Durham, NC (US); Razia Aziz, Durham, NC (US); Hamid Aziz, Durham, NC (US); Mateen Aziz, Durham, NC (US)

( * ) Notice: Subject to any disclaimer, the term of this patent is extended or adjusted under 35 U.S.C. 154(b) by 304 days.

(21) Appl. No.: 17/708,872

(22) Filed: Mar. 30, 2022

(65) Prior Publication Data
US 2022/0314848 A1   Oct. 6, 2022

Related U.S. Application Data

(60) Provisional application No. 63/170,273, filed on Apr. 2, 2021.

(51) Int. Cl.
| | | |
|---|---|---|
| *B60N 2/427* | (2006.01) | |
| *B60N 2/50* | (2006.01) | |
| *B60N 2/52* | (2006.01) | |
| *B62D 1/04* | (2006.01) | |

(52) U.S. Cl.
CPC ......... *B60N 2/42736* (2013.01); *B60N 2/501* (2013.01); *B60N 2/505* (2013.01); *B60N 2/52* (2013.01); *B62D 1/04* (2013.01)

(58) Field of Classification Search
CPC .... B60N 2/42736; B60N 2/501; B60N 2/505; B60N 2/52; B60N 2/0272; B60N 2/1665; B60N 2/4279; B62D 1/04
See application file for complete search history.

(56) References Cited

U.S. PATENT DOCUMENTS

| | | | |
|---|---|---|---|
| 3,452,834 A * | 7/1969 | Gaut | B60N 2/4221 296/68.1 |
| 5,180,275 A | 1/1993 | Czech | |
| 6,625,932 B1 * | 9/2003 | Littlefield | E04H 3/126 52/10 |
| 2006/0273623 A1 | 12/2006 | Romano | |

(Continued)

FOREIGN PATENT DOCUMENTS

| | | |
|---|---|---|
| CN | 101905662 | 12/2010 |
| CN | 203048371 | 7/2013 |

(Continued)

*Primary Examiner* — Lori Lyjak
(74) *Attorney, Agent, or Firm* — LEAVITT & ELDREDGE; Richard Eldredge

(57) ABSTRACT

The present invention is an elevated vehicle system. The preferred embodiment of the present invention has a steering wheel, an engine, a plurality of seats, a plurality of windows, and a plurality of wheels. The steering wheel rotates to turn the plurality of wheels. The engine has a transmission and power system. The power system is a battery that provides power to various components within the present invention. The plurality of seats has a seatbelt, a hydraulic lift, and a plurality of buttons. The seatbelt is a flexible, nonelastic material that holds a passenger in their seat. The hydraulic lift is a mechanical system that lifts and lowers the seat. The plurality of buttons is used to control the height positioning of the seat. Additionally, a sensor is used to control the raising and lowering of the seats.

20 Claims, 3 Drawing Sheets

(56) References Cited

U.S. PATENT DOCUMENTS

2009/0299577 A1* 12/2009 Demant ............ B60R 21/01546
              701/45
2018/0141508 A1* 5/2018 Lee ..................... B60R 16/0232
2020/0146911 A1* 5/2020 Whitlock ............. A61G 7/1038

FOREIGN PATENT DOCUMENTS

| CN | 107791902 A | * | 3/2018 | |
| CN | 111068250 A | * | 4/2020 | |
| EP | 1052215 A2 | * | 11/2000 | |
| WO | WO2002030704 A1 | | 4/2002 | |
| WO | WO-2006134417 A1 | * | 12/2006 | ........... B60N 2/0276 |

\* cited by examiner

ELEVATED VEHICLE SYSTEM

FIELD OF THE INVENTION

The present invention relates generally to an elevated vehicle system. More specifically, the present invention provides a system for raising the seats within a motor vehicle to move individuals out of harm's way during a collision.

BACKGROUND OF THE INVENTION

Motor vehicles are a common mode of transportation for individuals attempting to travel long and short distances. Unfortunately, vehicle accidents and collisions are a common part of traveling. These vehicle collisions result in various damage to the vehicle, injury, disability to the individuals in the vehicle, death, and property damage. Many standard vehicles are designed with a single floor level that places the individuals within the car in the direct line of impact during a vehicle collision. This layout of the standard vehicle increases the chance of detrimental results from a vehicle collision and decreases the safety of the individual within the vehicle. The present invention intends to provide a new layout to a motor vehicle that ensures individuals within the vehicle are safe. The present invention is designed with a larger cabin space in which the plurality of seats is raised to move the individuals within the vehicle out of harm's way during a vehicle collision.

DETAIL DESCRIPTIONS OF THE INVENTION

All illustrations of the drawings are for the purpose of describing selected versions of the present invention and are not intended to limit the scope of the present invention.

Figure 1:
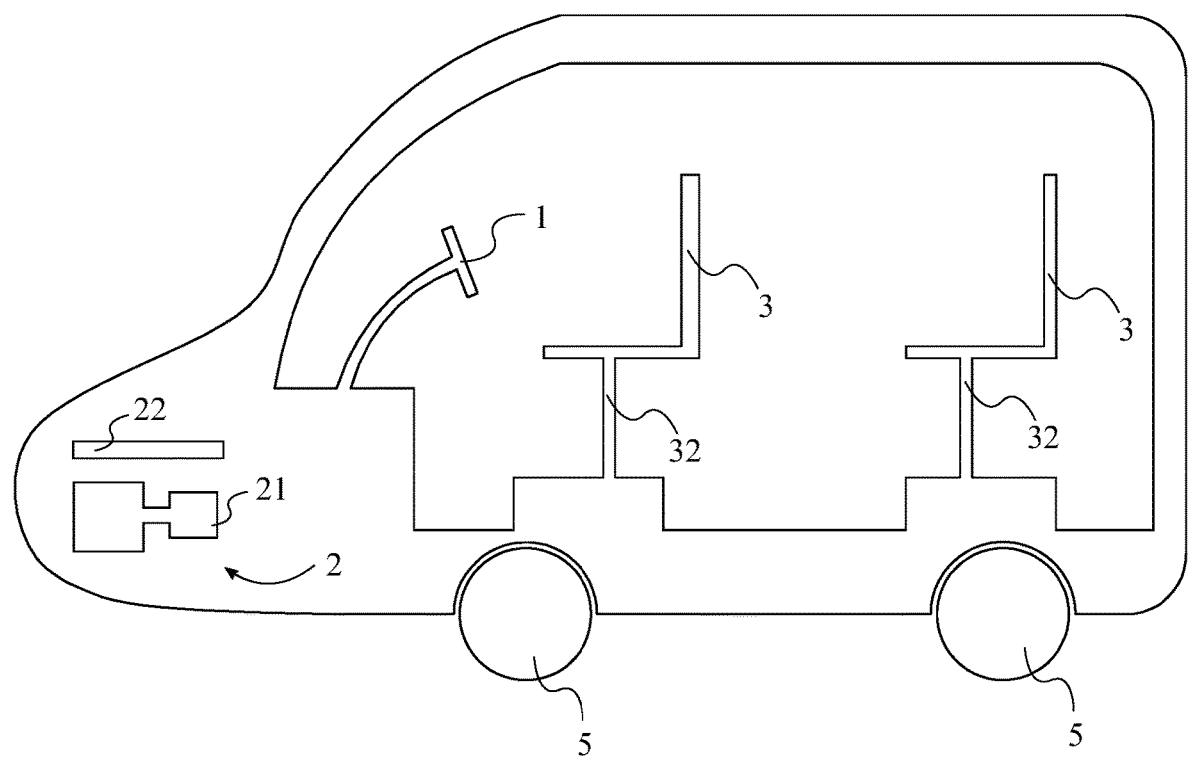
FIG. 1 is an internal side view of the present invention.

In reference to FIG. 1, the present invention is an elevated vehicle system. The preferred embodiment of the present invention comprises a steering wheel 1, an engine 2, a plurality of seats 3, a plurality of windows 4, and a plurality of wheels 4. The steering wheel 1 is lightweight metal circular structure that rotates to turn the plurality of wheels 4. The engine 2 comprises a transmission 21 and power system 22. The power system 22 is a battery that provides power to various components within the present invention. The plurality of seats 3 comprises a seatbelt 31, a hydraulic lift 32, and a plurality of buttons 33. The seatbelt 31 is a flexible, nonelastic material that secures an individual into each of the plurality of seats 3. The hydraulic lift 32 is a mechanical system that is designed to raise and lower with one degree of freedom. The plurality of buttons 33 is designed with a circular shape that sends an electrical current when pressed. The steering wheel 1 is mechanically connected to the plurality of wheels 4. Accordingly, the steering wheel 1 controls the direction the plurality of wheels 4 is pointing as the steering wheel 1 is rotated clockwise or counterclockwise. The engine 2 is mechanically connected to the plurality of wheels 4. Consequently, the engine 2 output force results in a rotational motion for each of the plurality of wheels 4. The plurality of seats 3 and plurality of windows 4 is electrically connected to the power system 22. As a result, the plurality of seats 3 and plurality of windows 4 receive the power to operate from the power system 22.

Further, the steering wheel 1 is ring shaped. Thus, the shape of the steering wheel 1 stays consistent regardless of the rotational orientation of the steering wheel 1. As shown in FIG. 1, the steering wheel 1 is rotatable around the center of the steering wheel 1. So, the steering wheel 1 can be rotated clockwise and counterclockwise around the center of the steering wheel 1 to position the plurality of wheels 4.

Furthermore, the engine 2 is a combustion engine. Accordingly, the engine 2 is preferably a combustion style engine that utilizes fuel to create an output force in the form of torque. The engine 2 is mechanically connected to the transmission 21 seen in FIG. 2. Consequently, the output torque from the engine 2 to transferred to the transmission 21, which reduces or increases the torque to the wheels with an internal standard gear ratio system. The power system 22 is positioned above the engine 2. As a result, the power system 22 does not interfere with the engine 2 and conveniently provides power to the rest of the vehicle components.

In reference to FIG. 1, the plurality of seats 3 is positioned offset the steering wheel 1. Thus, the plurality of seats 3 does not move upwards into the steering wheel 1. The seatbelt 31 is terminally connected to the plurality of seats 3. So, the seatbelt 31 secures an individual into the each of the plurality of seats 3. The plurality of seats 3 is mechanically connected to the hydraulic lift 32. Accordingly, the plurality of seats 3 is raised and lowered with the hydraulic lift 32. The plurality of buttons 33 is electrically connected to the hydraulic lift 32. Consequently, the plurality of buttons 33 controls the electrical power to the hydraulic lift 32.

Figure 3:
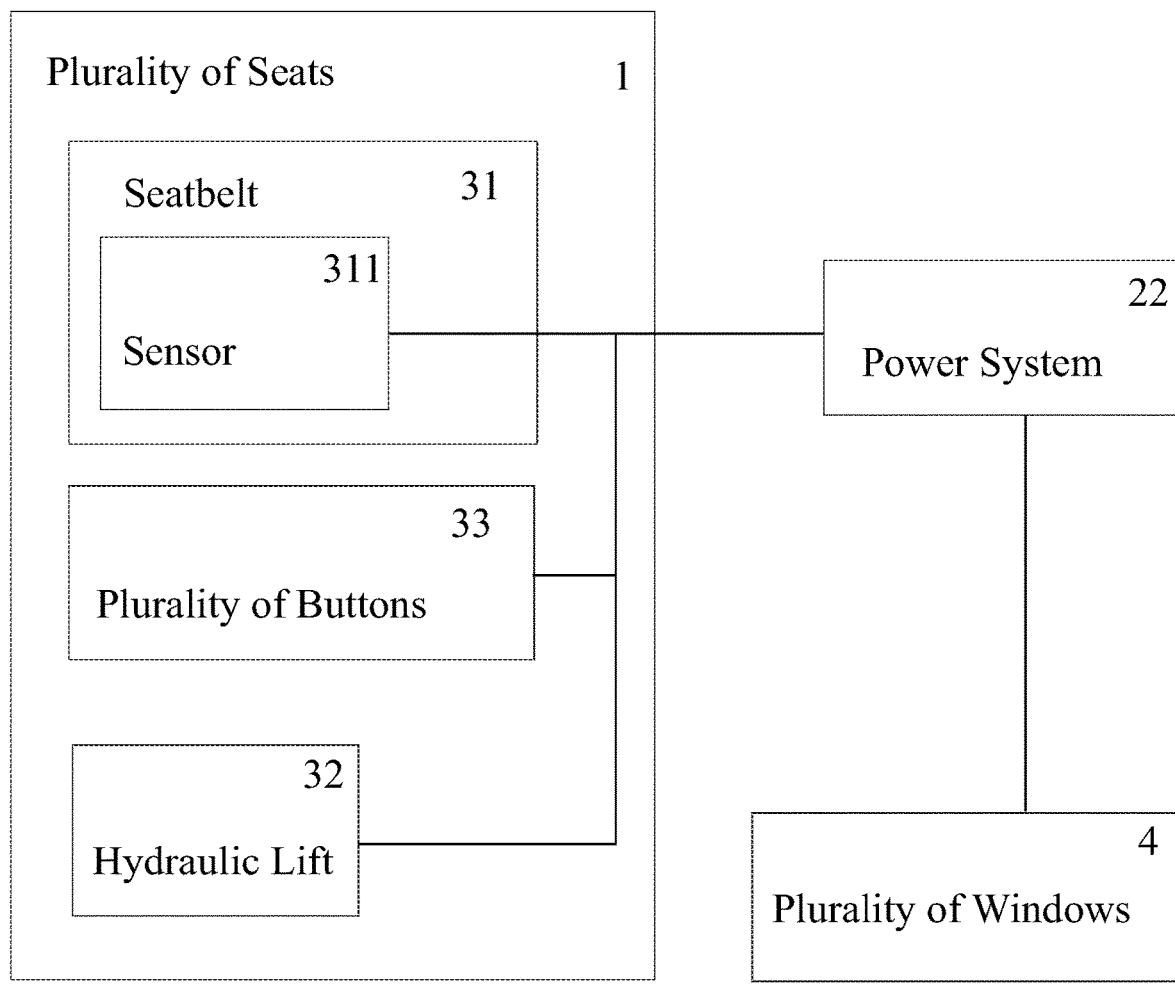
FIG. 3 is a block diagram of the electrical connections of the present invention.

In reference to FIG. 3, the seatbelt 31 comprises a sensor 311. The sensor 311 detects if the seatbelt 31 is fastened or unfastened. The sensor 311 is terminally connected to the seatbelt 31. As a result, the sensor 311 is only activated when the seatbelt 31 wraps around the individual in the each of the plurality of seats 3 and is fastened.

Further, the sensor 311 is electrically connected to the hydraulic lift 32. Thus, the sensor 311 sends an electrical signal to the hydraulic lift 32 indicating if the seatbelt 31 is fastened or unfastened. The sensor 311 controls the raising and lowering movement of the hydraulic lift 32. As seen in FIG. 3, the sensor 311 sends an electrical signal to the hydraulic lift 32 to move the hydraulic lift 32 upwards if the seatbelt 31 is fastened.

Furthermore, the plurality of windows 4 is positioned offset the plurality of seats 3. Accordingly, the plurality of windows 4 is next to each of the plurality of seats 3. The plurality of windows 4 is electrically connected to the power system 22. Consequently, the plurality of windows 4 can be raised and lowered from the electrical current provided by the power system 22 as shown in FIG. 3.

Figure 2:
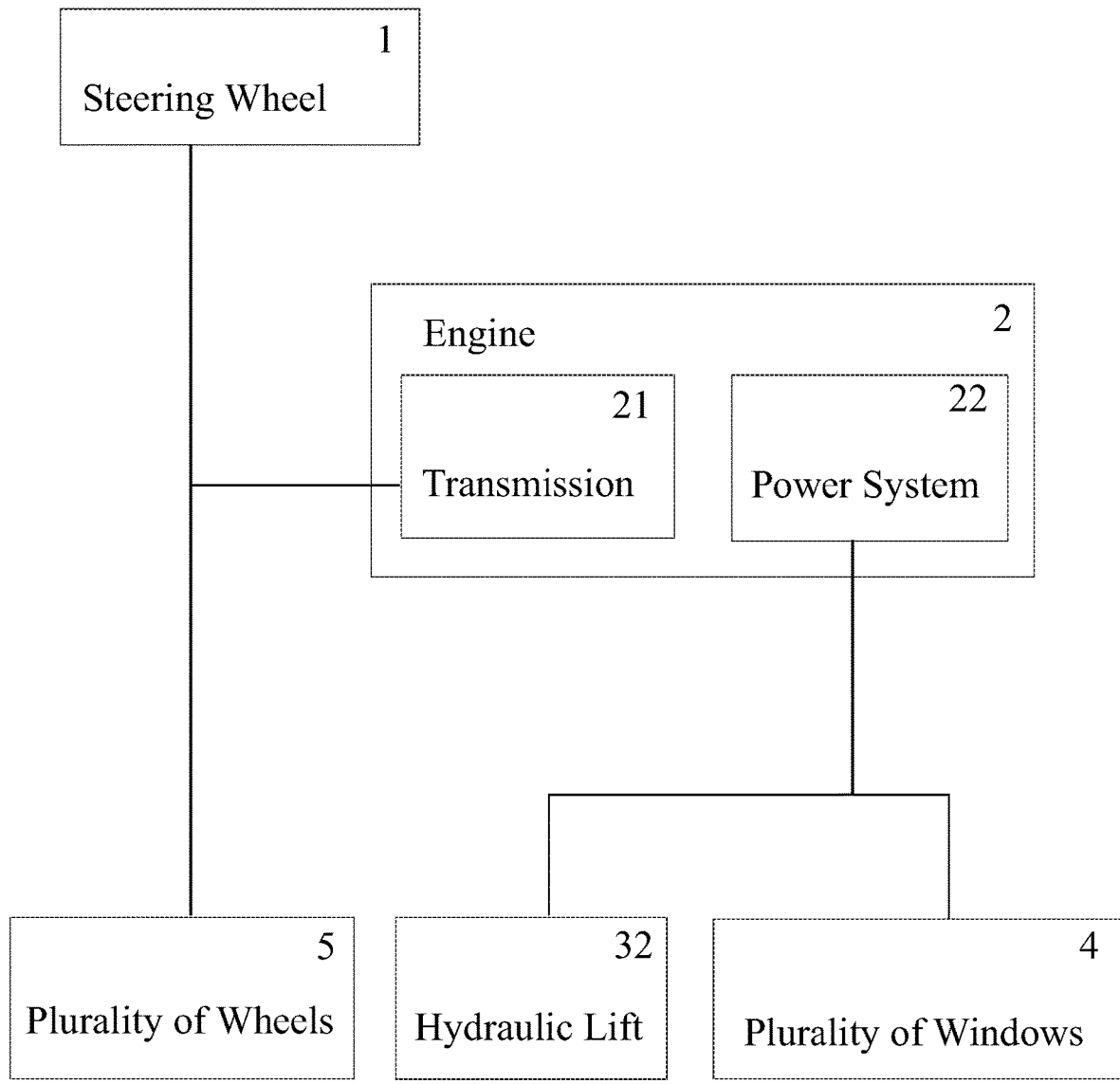
FIG. 2 is a block diagram of the mechanical connections of the present invention.

In reference to FIG. 2, the plurality of wheels 4 is positioned offset the plurality of windows 4. As a result, the plurality of wheels 4 does not interfere with the raising and lowering the plurality of windows 4. The plurality of wheels 4 is mechanically connected to the transmission 21. Thus, the plurality of wheels 4 receives a torque input from the transmission 21.

In reference to FIG. 2, the plurality of wheels 4 is positioned offset the plurality of seats 3. As a result, the plurality of wheels 4 does not interfere with the raising and lowering the plurality of seats 3. The plurality of wheels 4 rotates around the center of each of the plurality of wheels 4. Thus, the plurality of wheels 4 rotates due to the torque from the transmission 21 moving the present invention forwards or backwards.

Further, the plurality of seats 3 is vertically positioned by the hydraulic lift 32. So, the plurality of seats 3 can move vertically from the force produced by the hydraulic lift 32. The plurality of seats 3 is retractably lowered by gravity. Accordingly, as referenced in FIG. 1, the plurality of seats 3 moves downwards due to the force of gravity when the hydraulic lift 32 is not applying any upwards force.

Furthermore, the plurality of seats 3 is simultaneously raised by the hydraulic lift 32 as seen in FIG. 1. Thus, the plurality of seats 3 moves vertically at the in sync to ensure no seat is left in the collision area. The plurality of seats 3 is simultaneously lowered by gravity. So, the plurality of seats 3 moves downwards due to the force of gravity in sync to ensure an individual can enter and exit the present invention easily.

Although the invention has been explained in relation to its preferred embodiment, it is to be understood that many other possible modifications and variations can be made without departing from the spirit and scope of the invention as hereinafter claimed.

What is claimed is:

1. An elevated vehicle system comprising:
   a steering wheel;
   an engine;
   a plurality of seats;
   a plurality of windows;
   a plurality of wheels;
   the engine comprising a transmission and power system;
   a hydraulic lift secured to a seat of the plurality of seats, the hydraulic lift is configured to adjustably elevate the seat via a button;
   the steering wheel being mechanically connected to the plurality of wheels; the engine being mechanically connected to the plurality of wheels, and
   the plurality of seats and plurality of windows being electrically connected to the power system.

2. The elevated vehicle system as claimed in claim 1 comprising:
   the steering wheel being ring shaped, and
   the steering wheel being rotatable around the center of the steering wheel.

3. The elevated vehicle system as claimed in claim 1 comprising:
   the engine being a combustion engine;
   the engine being mechanically connected to the transmission, and the power system being positioned above the engine.

4. The elevated vehicle system as claimed in claim 1 comprising:
   the plurality of seats being positioned offset the steering wheel;
   a seatbelt being terminally connected to the plurality of seats;
   the plurality of seats being mechanically connected to the hydraulic lift, and a plurality of buttons being electrically connected to the hydraulic lift.

5. The elevated vehicle system as claimed in claim 4 comprising:
   the seatbelt comprising a sensor, and
   the sensor being terminally connected to the seatbelt.

6. The elevated vehicle system as claimed in claim 5 comprising:
   the sensor being electrically connected to the hydraulic lift, and
   the sensor controlling the raising and lowering movement of the hydraulic lift.

7. The elevated vehicle system as claimed in claim 1 comprising:
   the plurality of windows being positioned offset the plurality of seats, and
   the plurality of windows being electrically connected to the power system.

8. The elevated vehicle system as claimed in claim 1 comprising:
   the plurality of wheels being positioned offset the plurality of windows, and
   the plurality of wheels being mechanically connected to the transmission.

9. The elevated vehicle system as claimed in claim 1 comprising:
   the plurality of wheels being positioned offset the plurality of seats, and
   the plurality of wheels rotating around the center of each of the plurality of wheels.

10. The elevated vehicle system as claimed in claim 1 comprising:
    the plurality of seats being vertically positioned by the hydraulic lift, and the plurality of seats being retractably lowered by gravity.

11. The elevated vehicle system as claimed in claim 1 comprising:
    the plurality of seats being simultaneously raised by the hydraulic lift, and
    the plurality of seats being simultaneously lowered by gravity.

12. An elevated vehicle system comprising:
    a steering wheel;
    an engine;
    a plurality of seats;
    a plurality of windows;
    a plurality of wheels;
    the engine comprising a transmission and power system;
    a hydraulic lift secured to a seat of the plurality of seats, the hydraulic lift is configured to adjustably elevate the seat via a button;
    the steering wheel being mechanically connected to the plurality of wheels;
    the engine being mechanically connected to the plurality of wheels;
    the plurality of seats and plurality of windows being electrically connected to the power system;
    the steering wheel being ring shaped;
    the steering wheel being rotatable around the center of the steering wheel; the engine being a combustion engine;
    the engine being mechanically connected to the transmission, and the power system being positioned above the engine.

13. The elevated vehicle system as claimed in claim 12 comprising:
    the plurality of seats being positioned offset the steering wheel;
    a seatbelt being terminally connected to the plurality of seats;
    the plurality of seats being mechanically connected to the hydraulic lift, and a plurality of buttons being electrically connected to the hydraulic lift.

14. The elevated vehicle system as claimed in claim 13 comprising:
    the seatbelt comprising a sensor, and
    the sensor being terminally connected to the seatbelt.

15. The elevated vehicle system as claimed in claim 14 comprising:
the sensor being electrically connected to the hydraulic lift, and
the sensor controlling the raising and lowering movement of the hydraulic lift.

16. The elevated vehicle system as claimed in claim 12 comprising:
the plurality of windows being positioned offset the plurality of seats, and the plurality of windows being electrically connected to the power system.

17. The elevated vehicle system as claimed in claim 12 comprising:
the plurality of wheels being positioned offset the plurality of windows, and the plurality of wheels being mechanically connected to the transmission.

18. The elevated vehicle system as claimed in claim 12 comprising:
the plurality of wheels being positioned offset the plurality of seats, and
the plurality of wheels rotating around the center of each of the plurality of wheels.

19. The elevated vehicle system as claimed in claim 12 comprising:
the plurality of seats being vertically positioned by the hydraulic lift, and
the plurality of seats being retractably lowered by gravity.

20. The elevated vehicle system as claimed in claim 12 comprising:
the plurality of seats being simultaneously raised by the hydraulic lift, and
the plurality of seats being simultaneously lowered by gravity.

* * * * *